(12) United States Patent
Bentley et al.

(10) Patent No.: US 9,703,876 B2
(45) Date of Patent: *Jul. 11, 2017

(54) NORMALIZATION OF CONFIDENCE THRESHOLDS IN FEDERATED ENVIRONMENTS

(71) Applicant: International Business Machines Corporation, Armonk, NY (US)

(72) Inventors: Alexander T. Bentley, Austin, TX (US); Soma Shekar Naganna, Bangalore (IN); Scott Schumacher, Porter Ranch, CA (US); Shweta Shandilya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 14/548,325

(22) Filed: Nov. 20, 2014

(65) Prior Publication Data

US 2016/0147885 A1    May 26, 2016

(51) Int. Cl.
*G06F 17/30* (2006.01)

(52) U.S. Cl.
CPC .. *G06F 17/30867* (2013.01); *G06F 17/30377* (2013.01); *G06F 17/30536* (2013.01); *G06F 17/30545* (2013.01)

(58) Field of Classification Search
None
See application file for complete search history.

(56) References Cited

U.S. PATENT DOCUMENTS

| | | | |
|---|---|---|---|
| 6,085,186 A * | 7/2000 | Christianson | G06F 17/30864 |
| 7,283,997 B1 * | 10/2007 | Howard, Jr. | G06F 17/30702 |
| 7,599,922 B1 | 10/2009 | Chen et al. | |
| 8,131,705 B2 | 3/2012 | Chevalier et al. | |
| 8,386,469 B2 | 2/2013 | Reuther et al. | |
| 2008/0244008 A1 | 10/2008 | Wilkinson et al. | |
| 2015/0227631 A1 * | 8/2015 | Legrand | G06F 17/30867 707/722 |
| 2016/0196350 A1 * | 7/2016 | Mau | G06F 17/30256 707/706 |

OTHER PUBLICATIONS

Mau et al., "Gaussian probabilistic confidence score for biometric applications," 2012 International Conference on Digital Image Computing Techniques and Applications (DICTA), IEEE, 2012.*

(Continued)

*Primary Examiner* — Jay Morrison
(74) *Attorney, Agent, or Firm* — Brian M. Restauro; Noah A. Sharkan

(57) ABSTRACT

Embodiments of the present invention provides methods, computer program products, and systems for normalizing confidence score thresholds across systems in a federated environment. Embodiments of the present invention can be used to calculate normalization factors for participating hubs in a federated environment to normalize confidence score thresholds applied by those hubs and improve search results obtained therefrom.

13 Claims, 5 Drawing Sheets

(56) References Cited

OTHER PUBLICATIONS

Bigelow et al., "Using Probabilistic Linkage to Merge Multiple Data Sources for Monitoring Population Health", Center for Health Systems Research & Analysis, University of Wisconsin—Madison, Jun. 1999.
IBM, "Federated Access Control in Distributed Data Warehousing Applications", An IP.com Prior Art Database Technical Disclosure, Original Publication Date: Nov. 6, 2008, IP.com No. IPCOM000176162D, IP.com Electronic Publication: Nov. 6, 2008, pp. 1-12, <http://ip.com/IPCOM/000176162>.
"Effective Matching of record in Federated Environment", An IP.com Prior Art Database Technical Disclosure, Authors et. al.: Disclosed Anonymously, Ip.com No. IPCOM000228528D, IP.com Electronic Publication: Jun. 17, 2013, pp. 1-3, <http://ip.com/IPCOM/000228528>.
"Normalization of Confidence Thresholds in Federated Environments", U.S. Appl. No. 14/745,842, filed Jun. 22, 2105, pp. 1-25.
IBM Appendix P, list of IBM patents or patent applications treated as related, Jun. 22, 2015, pp. 1-2.

\* cited by examiner

NORMALIZATION OF CONFIDENCE THRESHOLDS IN FEDERATED ENVIRONMENTS

FIELD OF THE INVENTION

The present invention relates generally to the field of federated environments, and more particularly to federated probabilistic search and match environments.

BACKGROUND OF THE INVENTION

A federated probabilistic environment typically comprises a collection of networked, interoperable hubs, each of which can comprise computer systems, databases, and/or other resources. A federated probabilistic search refers to an informational retrieval technology where a user can make a single query request to an originating hub, which in turn distributes the query request to other hubs in the federated probabilistic environment. Data retrieved from a federated probabilistic search can be consolidated by the originating hub and returned to the user.

Each hub in a federated probabilistic search environment typically uses confidence scores to rank the relevance of search results to the search query. A high confidence score indicates a strong likelihood of relevance to the search query. Confidence score thresholds can be used to determine whether a particular search result will be included in the results returned to a user based on the confidence score associated with that result. For example, a confidence score greater than or equal to a confidence score threshold may be included in the results returned to a user. Each hub in a federated probabilistic search environment can be configured differently with different algorithms and thresholds.

SUMMARY

Embodiments of the present invention provide systems, methods, and program products for normalizing confidence score thresholds across systems in a federated environment. In one embodiment of the present invention, a method is provided comprising: receiving, by a first hub of a plurality of hubs of a federated environment, a first search query from a calling application; generating, by the first hub, a first confidence score for a result of the first search query; calculating a normalized confidence score threshold for a second hub of the plurality of hubs of the federated environment by applying a first normalization factor associated with the second hub to the first confidence score; transmitting, from the first hub to the second hub, a second search query with the normalized confidence score threshold calculated for the second hub; and receiving, by the first hub from the second hub, one or more results of the second search query that satisfy the normalized confidence score threshold calculated for the second hub.

DETAILED DESCRIPTION

Embodiments of the present invention recognize that federated probabilistic search environments can return disparate and/or otherwise undesirable search results due to each hub in the federated environment being configured differently with its own respective confidence score calculations and confidence score thresholds. In some instances, a hub may have a very high confidence score threshold and may not return a relevant result because its confidence score did not meet the threshold. Conversely, a hub may have a very low confidence score threshold and allow irrelevant results or too many results. Thus, results can tend to be over inclusive or under inclusive, and the quality of matching results depends largely on the search query. Embodiments of the present invention provide systems, methods, and computer program products for normalizing confidence score thresholds across systems in a federated environment. As discussed in greater detail in this specification, embodiments of the present invention can be used to manage confidence score thresholds across systems in a federated environment by calculating a normalization factor and using that normalization factor to normalize confidence score thresholds to provide more accurate search results in federated environments. Accordingly, embodiments of the present invention can help reduce the disparate search results from data retrieved from participating hubs.

Figure 1:
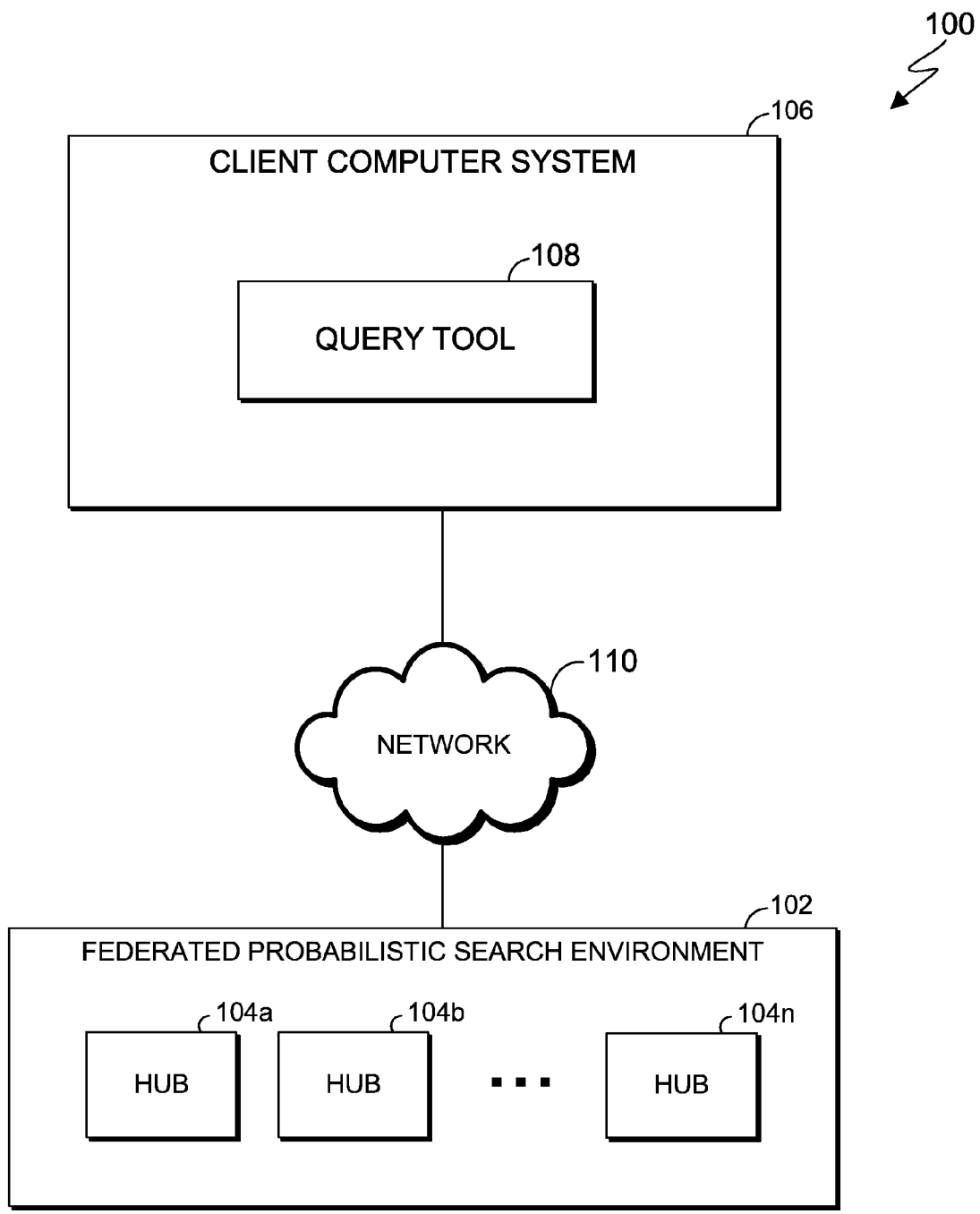
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 includes federated probabilistic search environment 102 and client computer system 106. Federated probabilistic search environment 102 comprises a plurality of hubs 104a-n. Each of hubs 104a-n is capable of executing a search query and returning results, and may comprise any desired combination of hardware and software to facilitate receiving search queries, transmitting search queries, and returning search results amongst other hubs in federated probabilistic search environment 102, in accordance with embodiments of the present invention. Each of hubs 104a-n can calculate a confidence score for results of a search query. In this embodiment, a confidence score is a numerical value that quantifies relevance of a result to a search query, where higher confidence scores represent higher relevancy. Each of hubs 104a-n is associated with a confidence score threshold. A confidence score threshold is used to determine whether a particular search result will be included in the search results returned by a hub (e.g., results having a confidence score greater than or equal to the confidence score threshold will be included in the search results, while results having a confidence score less than the confidence score threshold will be excluded from the search results).

The phrase "originating hub", as used herein, refers to a hub of federated probabilistic search environment 102 that is designated to receive a search query from query tool 108 and is responsible for transmitting a search query to, receiving results from, and re-scoring results (i.e., assigning a confidence score for existing results) received from, one or more receiving hubs in federated probabilistic search environment 102. The phrase "receiving hub", as used herein, refers to a hub of federated probabilistic search environment 102 that receives search queries from, and returns results to, the originating hub. Any of the plurality of hubs 104a-n in federated probabilistic search environment 102 can serve as an originating hub, and all of the other hubs in the plurality of hubs 104a-n in federated probabilistic search environment 102 can be receiving hubs. When an originating hub transmits a search query to multiple receiving hubs in federated probabilistic search environment 102, it can do so in parallel (i.e., simultaneously to each receiving hub in federated probabilistic search environment 102) or in series (i.e., to each receiving hub in a sequential order).

Client computer system 106 can be a desktop computer, laptop computer, specialized computer server, or any other computer system known in the art. In certain embodiments, client computer system 106 represents a computer system utilizing clustered computers and components to act as a single pool of seamless resources when accessed through network 110. In general, client computer system 106 is representative of any electronic device or combination of electronic devices capable of executing machine-readable program instructions, as described in greater detail with regard to FIG. 5.

Client computer system 106 includes query tool 108. Query tool 108 is a calling application that communicates with federated probabilistic search environment 102 via network 110 (e.g., using TCP/IP) to transmit search queries to, and receive results from, an originating hub of the plurality of hubs 104a-104n. A search query is a string of query terms pertaining to a particular subject area that is of interest to a user. For example, query tool 108 can be implemented using a browser and web portal or any program that transmits search queries to, and receives results from, federated probabilistic search environment 102.

Network 110 can be, for example, a local area network (LAN), a wide area network (WAN) such as the Internet, or a combination of the two, and include wired, wireless, or fiber optic connections. In general, network 110 can be any combination of connections and protocols that will support communications between federated probabilistic search environment 102, hubs 104a-n, and client computer system 106, in accordance with a desired embodiment of the invention.

Figure 2:
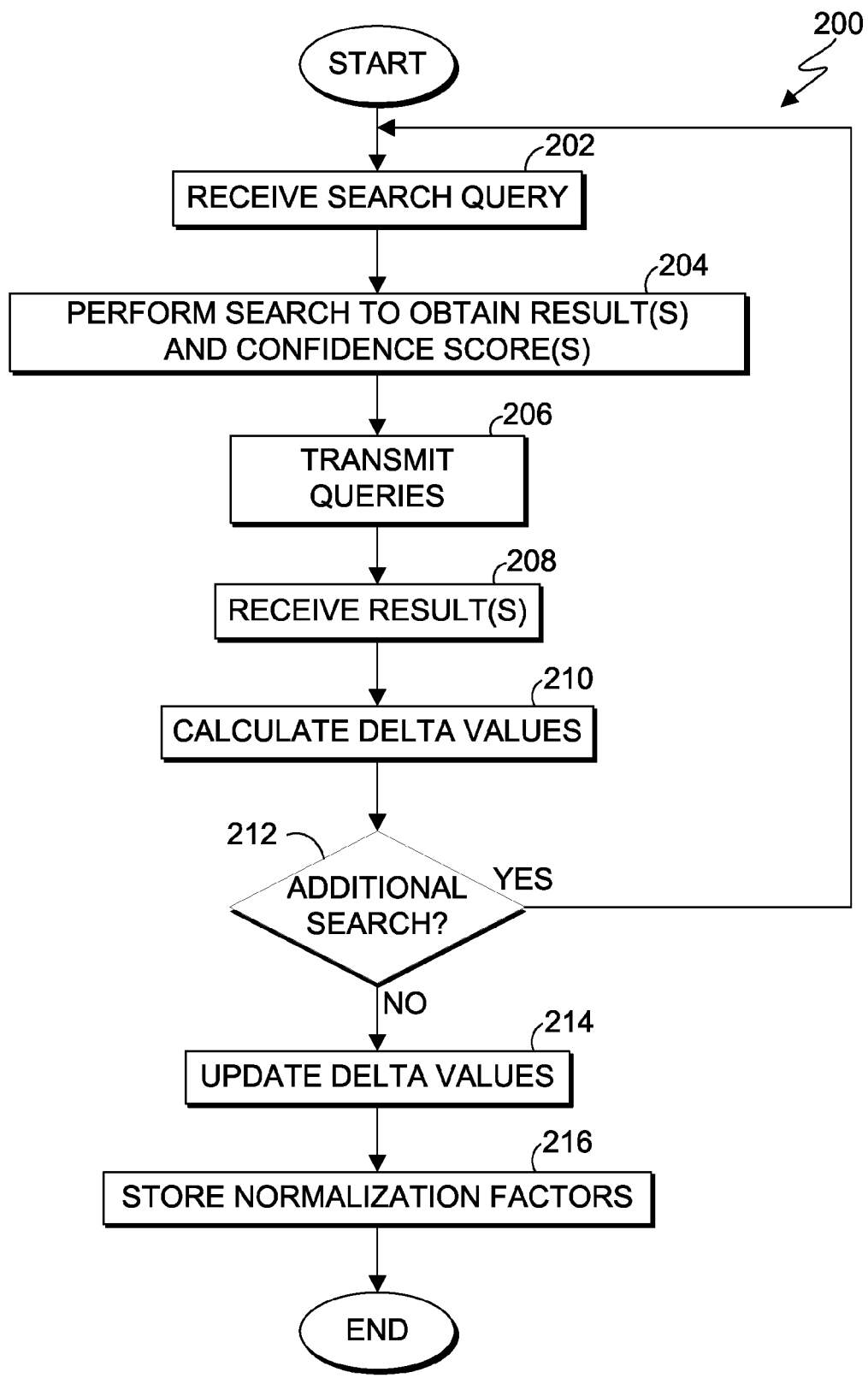
FIG. 2 is a flowchart illustrating operational steps for calculating a normalization factor, in accordance with an embodiment of the present invention.

FIG. 2 is a flowchart 200 illustrating operational steps for calculating normalization factors, in accordance with an embodiment of the present invention. A normalization factor is used to normalize the confidence score threshold associated with a hub of federated probabilistic search environment 102. For illustrative purposes, the following discussion is made with respect to hub 104a serving as an originating hub and hubs 104b-n serving as receiving hubs; however, it should be understood that any of the plurality of hubs 104a-n in federated probabilistic search environment 102 can serve as an originating hub, and all of the other hubs in the plurality of hubs 104a-n in federated probabilistic search environment 102 can be receiving hubs.

In step 202, hub 104a receives a search query from query tool 108. In other embodiments, hub 104a can receive a search query from one or more other components of computing environment 100.

In step 204, hub 104a performs a search. In this embodiment, hub 104a performs a search according to the search query, obtains one or more results, and calculates confidence scores associated for those results. For example, hub 104a may receive a search query for "John Doe, D.O.B., 1/23/45". Hub 104a then conducts a search and may return a result containing information for "John Doe, 123 Court St., Somewhere, NY" with an associated confidence score of 9.0, which is greater than its confidence score threshold of 8.0.

In step 206, hub 104a transmits a search query and score request to each of hubs 104b-n. In this embodiment, the search query comprises the original search query plus any additional search terms found in results returned by hub 104a. The score request represents a request for the associated confidence score for one or more results of the search returned by a receiving hub. In this embodiment, hub 104a transmits the search query and score request to each of hubs 104b-n in parallel. Using the above example, the search query transmitted by hub 104a could be "John Doe, D.O.B. 1/23/45, 123 Court St., Somewhere, NY".

In step 208, hub 104a receives one or more results for the search query and confidence scores returned by hubs 104b-n in response to executing the search query. If one or more of hubs 104b-n does not return any result, hub 104a transmits a command ordering those hubs to lower their respective confidence score thresholds by a specified amount (e.g., 20%) and to perform the search again in accordance with the lowered confidence score threshold, repeating as necessary to return one or more results that satisfy the confidence score threshold, or until a specified number of iterations (i.e., iterations of lowering a confidence score threshold by a specified amount) have been performed. For example, if hub 104b has a confidence score threshold of 9.0, a result having a confidence score of 8.0 would not be returned to hub 104a. If hub 104a did not receive any other results from hub 104b, hub 104a can transmit a command to hub 104b to lower the confidence score threshold by 20% and repeat the search, which would yield a confidence score threshold of 7.2, and the search result would now be returned to hub 104a. If the 20% reduction of the confidence score threshold was not sufficient, hub 104a can repeat the process until hub 104b returns a result or a specified number of attempts have been performed.

In step 210, hub 104a calculates a delta value for each of hubs 104b-n in federated probabilistic search environment 102. In this embodiment, hub 104a calculates delta values by re-scoring results received from each respective hub 104b-n and taking the difference between the confidence score associated with the first result returned by hub 104a and the re-scored confidence score associated with the first result returned by each of hubs 104b-n. For example, hub 104a could return its first result with a confidence score of 9 and hub 104a could re-score a first result received from hub 104b and assign that result a confidence score of 5. Hub 104a then calculates the delta value for hub 104b by subtracting the confidence score associated with the re-scored first result from its own (9−5) to yield a delta value of 4 for hub 104b. If the first result and the re-scored first result received from hub 104b are the same (i.e., the delta value for hub 104b would be zero), then, in this embodiment, hub 104a does not calculate and store a delta vale for hub 104b. In other embodiments, hub 104a could store a delta value of zero or a null value. If hubs 104a and 104b returned more than one result, hub 104a calculates a delta value for each result by calculating the difference between the confidence scores associated with the second re-scored result by hub 104a and the second result returned by hub 104b, the difference between the confidence scores associated with the third re-scored result by hub 104a and the third result returned by hub 104b, an so on for each result. Hub 104a then calculates the average of those delta values to yield the delta value for hub 104b.

In step 212, hub 104a determines whether an additional search should be performed. In this embodiment, hub 104a determines whether an additional search should be performed based on whether a specified number of searches have been performed. For example, hub 104a can be configured to conduct 100, 250, 500, 750, or 1000 different search queries to calculate the delta values for hubs 104b-n. In another embodiment, query tool 108 can issue instructions to hub 104a to perform an additional search.

If, in step 212, hub 104a determines an additional search should be performed, processing repeats for the additional search query at step 202, as previously discussed.

If, in step 212, hub 104a determines no additional search should be performed, then, in step 214, hub 104a updates the delta values for each of hubs 104b-n in federated probabilistic search environment 102. Updating the delta values refers to averaging one or more calculated delta values for each of hubs 104b-n. In this embodiment, hub 104a averages one or more stored delta values for hub 104b by adding the calculated delta values for hub 104b and dividing that number by the total number of delta values calculated for hub 104b, hub 104a averages delta values for hub 104c by adding the calculated delta values for hub 104c and dividing that number by the total number of delta values calculated for hub 104c, and so on for the remaining hubs 104d-n. For example, three delta values (e.g., 5, 6, and 4) may have been previously calculated for hub 104b. Hub 104a can access these historical values and calculate an updated delta value as an average of the historical values (e.g., 5). If there are no historical delta values for hub 104b (e.g., this is the first search performed and transmitted by hub 104a to hub 104b), then the originally calculated delta value is set as the updated delta value.

In step 216, hub 104a stores the respective updated delta values as the normalization factors for hubs 104b-n. In this embodiment, hub 104a stores the normalization factors locally. In other embodiments, hub 104a can store the normalization factors in any manner that allows future access to the normalization factors.

Accordingly, in this embodiment, hub 104a calculates normalization factors that can be used to normalize the confidence score thresholds associated with each of hubs 104b-n. The operational steps of FIG. 2 can be repeated, as necessary, to calculate a normalization factor for each hub in federated environment 100 with respect to a given originating hub.

Figure 3:
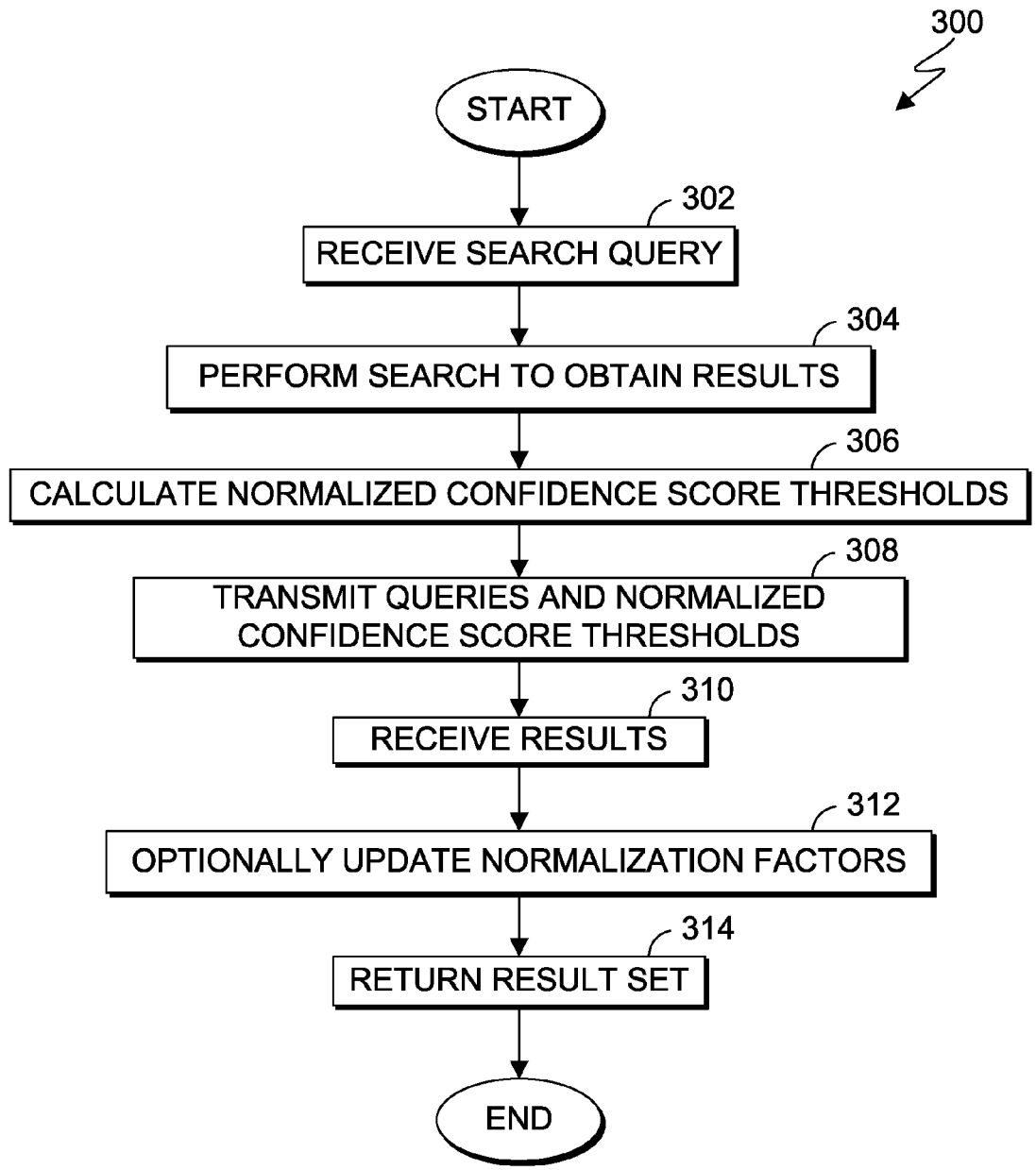
FIG. 3 is a flowchart illustrating operational steps for performing a federated probabilistic search, in accordance with an embodiment of the present invention.

FIG. 3 is a flowchart 300 illustrating operational steps for performing a federated probabilistic search in federated probabilistic search environment 102, in accordance with an embodiment of the present invention. Again, for illustrative purposes, the following discussion is made with respect to hub 104a serving as an originating hub and hubs 104b-n serving as receiving hubs; however, it should be understood that any of the plurality of hubs 104a-n in federated probabilistic search environment 102 can serve as an originating hub, and all of the other hubs in the plurality of hubs 104a-n in federated probabilistic search environment 102 can be receiving hubs.

In step 302, hub 104a receives a search query from query tool 108, as previously discussed with regard to step 202 of flowchart 200.

In step 304, hub 104a performs a search according to the search query and obtains one or more results and confidence scores associated with those results, as previously discussed with regard to step 204 of flowchart 200.

In step 306, hub 104a calculates a normalized confidence score threshold for each of hubs 104b-n. In this embodiment, hub 104a accesses the stored normalization factor associated with each of hubs 104b-n (as previously discussed with regard to step 206 of flowchart 200) and calculates a normalized confidence score threshold for each particular receiving hub by adding the normalization factor associated with that hub to the confidence score associated with a result (e.g., the first result, or the result with the highest confidence score) that hub 104a returned after performing the search in step 304. For example, hub 104a could return a result with a confidence score of 9 and access a calculated and stored normalization factor of −5 for hub 104b. Hub 104a calculates a normalized confidence score threshold for hub 104b by adding the confidence score associated with the first result returned by hub 104a and the normalization factor for hub 104b (i.e., 9+(−5)) to yield a normalized confidence score threshold of 4 for hub 104b.

In step 308, hub 104a transmits a search query and normalized confidence score threshold to each of hubs 104b-n. In this embodiment, hub 104a transmits to each of hubs 104b-n the search query received in step 302, along with the respective normalized confidence score threshold calculated in step 306.

In step 310, hub 104a receives one or more results from each of hubs 104b-n. In this embodiment, each of hubs 104b-n applies the normalized confidence score threshold (as discussed in greater detail with regard to FIG. 4), and transmits to hub 104a one or more results of the search query having confidence scores that meet the normalized confidence score threshold.

In step 312, hub 104a optionally updates the normalization factors for hubs 104b-n. In this embodiment, hub 104a determines whether a specified number of searches has been reached. For example, the specified number of searches could be on the order of 100, 250, 500, 750, or 1000. If the specified number of searches has not been reached, hub 104a can update the normalization factor for each of hubs 104b-n by calculating delta values between confidence scores associated with results obtained by hub 104a in step 304 and confidence scores associated with results received from that particular hub in step 308, and then averaging the calculated delta values with one or more historical delta values for that particular hub.

In step 314, hub 104a returns a result set of the search query received in step 302 to query tool 108. In this embodiment, hub 104a returns a merged result set comprising a compilation of one or more results received by hubs 104b-n in step 310 along with results obtained by hub 104a in step 304. The merged result set can be filtered in any desired manner (e.g., hub 104a can filter out duplicate search results and re-rank the search results according to the confidence scores of each search result).

Accordingly, in this embodiment, a federated probabilistic search is performed and results are returned that meet the normalized confidence score thresholds for each hub with respect to an originating hub, thereby helping to improve the quality of search results returned to the user by preventing disparate search results.

Figure 4:
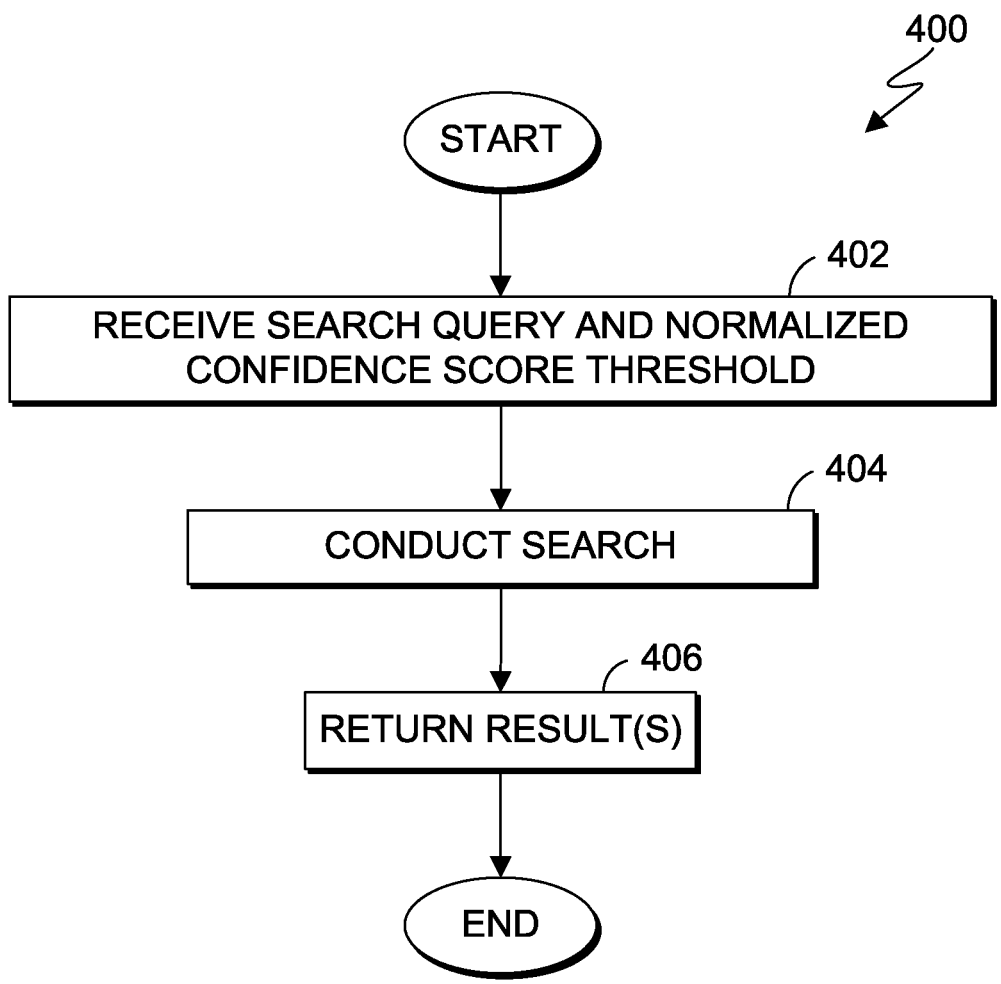
FIG. 4 is a flowchart illustrating operational steps for applying a calculated normalized confidence score threshold, in accordance with an embodiment of the present invention.

FIG. 4 is a flowchart 400 illustrating operational steps for applying a calculated normalized confidence score threshold, in accordance with an embodiment of the present invention. Again, for illustrative purposes, the following discussion is made with respect to hub 104a serving as an originating hub and hubs 104b-n serving as receiving hubs; however, it should be understood that any of the plurality of hubs 104a-n in federated probabilistic search environment 102 can serve as an originating hub, and all of the other hubs in the plurality of hubs 104a-n in federated probabilistic search environment 102 can be receiving hubs. Furthermore, while the following discussion is made with respect to hub 104b, it should be understood that the operational steps of flowchart 400 are performed by each of hubs 104b-n (i.e., the receiving hubs), whether in parallel, series, or some combination thereof.

In step 402, hub 104b receives a search query and a normalized confidence score threshold associated with hub 104b from hub 104a. In this embodiment, hub 104b receives a search query from hub 104a in the same manner described in step 202 of flowchart 200.

In step 404, hub 104b conducts a search in the same manner described in step 204 of flowchart 200.

In step 406, hub 104b returns one or more results that satisfy the normalized confidence score threshold. In this embodiment, a normalized confidence score threshold is satisfied if the confidence score associated with a result is greater than or equal to the normalized confidence score threshold of a hub. For example, hub 104b could have received a normalized confidence score threshold of 6 in step 402. Although hub 104b may have originally had a confidence score threshold of 8.0, hub 104b applies the normalized confidence score threshold received from hub 104a, and returns results associated with confidence scores that are greater than or equal to 6.

Figure 5:
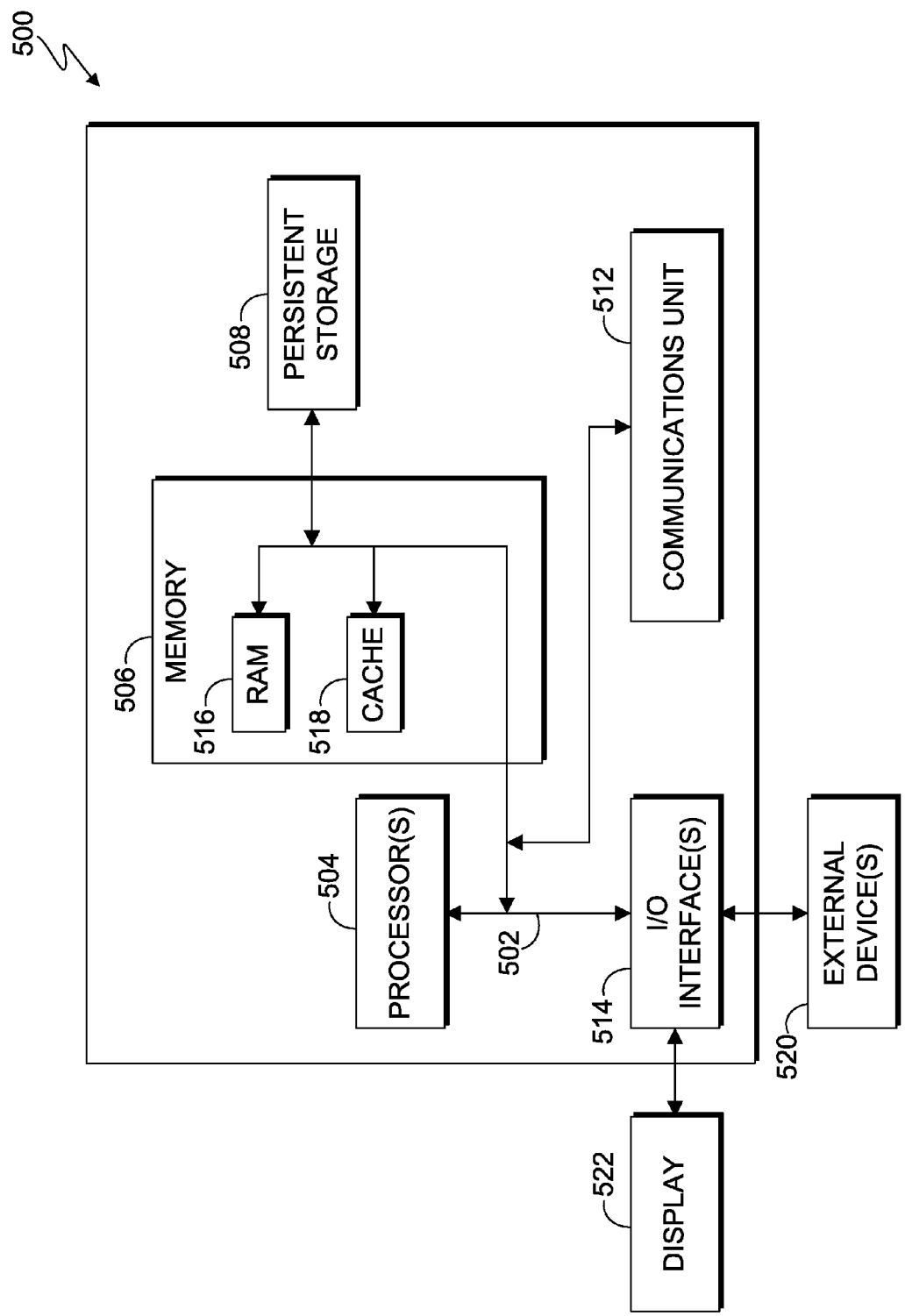
FIG. 5 is a block diagram of internal and external components of the computer systems of FIG. 1, in accordance with an embodiment of the present invention.

FIG. 5 depicts a block diagram of components of computer system 500 which is representative of the computer systems of FIG. 1, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, table computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

Persistent storage 508 may include, for example, a plurality of magnetic hard disk drives. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices via a network (e.g., network 110). In this embodiment, communications unit 512 includes network adaptors or interfaces such as TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers, and/or edge servers. Software and data used to practice embodiments of the present invention can be downloaded to client computer system 106 through communications unit 512 (e.g., via the Internet, a local area network, or other wide area network). From communications unit 512, the software and data can be loaded onto persistent storage 508.

I/O interface(s) 514 allows for input and output of data with other devices that may be connected to client computer system 106. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for normalizing confidence score thresholds, comprising:
    one or more computer-readable storage media and program instructions stored on the one or more computer-readable storage media, the program instructions comprising:
    program instructions to receive by a first hub of a plurality of hubs of a federated environment, a first search query from a calling application;
    program instructions to generate by the first hub, a first confidence score for a result of the first search query;
    program instructions to calculate a normalized confidence score threshold for a second hub of the plurality of hubs of the federated environment by applying a first normalization factor associated with the second hub to the first confidence score;
    program instructions to transmit from the first hub to the second hub, a second search query with the normalized confidence score threshold calculated for the second hub; and
    program instructions to receive by the first hub from the second hub, one or more results of the second search query that satisfy the normalized confidence score threshold calculated for the second hub.

2. The computer program product of claim 1, wherein the program instructions stored on the one or more computer-readable storage media further comprise:
    program instructions to calculate the first normalization factor based, at least in part, on a difference between a confidence score generated by the first hub and a confidence score generated by the second hub.

3. The computer program product of claim 1, wherein the program instructions stored on the one or more computer-readable storage media further comprise:
    program instructions to calculate the first normalization factor as an average of two or more previously calculated and stored normalization factors associated with the second hub.

4. The computer program product of claim 1, wherein the program instructions stored on the one or more computer-readable storage media further comprise:
    program instructions to generate by the first hub, a second confidence score for a result of a third search query received by the calling application;
    program instructions to calculate a second normalization factor by calculating an average of the first normalization factor and one or more previously calculated normalization factors associated with the second hub;
    program instructions to calculate a second normalized confidence score threshold for the second hub by applying the second normalization factor to the second confidence score;
    program instructions to transmit from the first hub to the second hub, a fourth search query with the second normalized confidence score threshold; and
    program instructions to receive by the first hub from the second hub, one or more results of the fourth search query that satisfy the second normalized confidence score threshold.

5. The computer program product of claim 1, wherein the program instructions stored on the one or more computer-readable storage media further comprise:
    program instructions to access by the second hub, a stored normalization factor associated with a third hub of the plurality of hubs;
    program instructions to calculate a normalized confidence score threshold for the third hub by applying the normalization factor associated with the third hub to a confidence score generated by the second hub;
    program instructions to transmit from the second hub to the third hub, a third search query and the normalized confidence score threshold for the third hub; and
    program instructions to receive by the second hub from the third hub, one or more results of the third search query that satisfy the normalized confidence score threshold for the third hub.

6. The computer program product of claim 1, wherein the second search query comprises:
    one or more search terms of the first search query; and
    one or more terms extracted from the result of the first search query.

7. The computer program product of claim 1, wherein the program instructions stored on the one or more computer-readable storage media further comprise:
    program instructions for the first hub to transmit the second search query to all other hubs of the plurality of hubs in the federated environment in parallel, along with a normalized confidence score threshold associated with each respective hub of the plurality of hubs in the federated environment.

8. A computer system for normalizing confidence score thresholds, comprising:
    one or more computer processors;
    one or more computer-readable storage media;
    program instructions stored on the computer-readable storage media for execution by at least one of the one or more processors, the program instructions comprising:
    program instructions to receive by a first hub of a plurality of hubs of a federated environment, a first search query from a calling application;
    program instructions to generate by the first hub, a first confidence score for a result of the first search query;
    program instructions to calculate a normalized confidence score threshold for a second hub of the plurality of hubs of the federated environment by applying a first normalization factor associated with the second hub to the first confidence score;
    program instructions to transmit from the first hub to the second hub, a second search query with the normalized confidence score threshold calculated for the second hub; and
    program instructions to receive by the first hub from the second hub, one or more results of the second search query that satisfy the normalized confidence score threshold calculated for the second hub.

9. The computer system of claim 8, wherein the program instructions stored on the computer-readable storage media for execution by at least one of the one or more processors, further comprise:
    program instructions to calculate the first normalization factor based, at least in part, on a difference between a confidence score generated by the first hub and a confidence score generated by the second hub.

10. The computer system of claim 8, wherein the program instructions stored on the computer-readable storage media for execution by at least one of the one or more processors, further comprise:
program instructions to calculate the first normalization factor as an average of two or more previously calculated and stored normalization factors associated with the second hub.

11. The computer system of claim 8, wherein the program instructions stored on the computer-readable storage media for execution by at least one of the one or more processors, further comprise:
program instructions to generate by the first hub, a second confidence score for a result of a third search query received by the calling application;
program instructions to calculate a second normalization factor by calculating an average of the first normalization factor and one or more previously calculated normalization factors associated with the second hub;
program instructions to calculate a second normalized confidence score threshold for the second hub by applying the second normalization factor to the second confidence score;
program instructions to transmit from the first hub to the second hub, a fourth search query with the second normalized confidence score threshold; and
program instructions to receive by the first hub from the second hub, one or more results of the fourth search query that satisfy the second normalized confidence score threshold.

12. The computer system of claim 8, wherein the program instructions stored on the computer-readable storage media for execution by at least one of the one or more processors, further comprise:
program instructions to access by the second hub, a stored normalization factor associated with a third hub of the plurality of hubs;
program instructions to calculate a normalized confidence score threshold for the third hub by applying the normalization factor associated with the third hub to a confidence score generated by the second hub;
program instructions to transmit from the second hub to the third hub, a third search query and the normalized confidence score threshold for the third hub; and
program instructions to receive by the second hub from the third hub, one or more results of the third search query that satisfy the normalized confidence score threshold for the third hub.

13. The computer system of claim 8, wherein the program instructions stored on the computer-readable storage media for execution by at least one of the one or more processors, further comprise program instructions for the first hub to transmit the second search query to all other hubs of the plurality of hubs in the federated environment in parallel, along with a normalized confidence score threshold associated with each respective hub of the plurality of hubs in the federated environment.

* * * * *